(12) United States Patent
Vu et al.

(10) Patent No.: US 10,211,450 B2
(45) Date of Patent: Feb. 19, 2019

(54) SYSTEMS AND METHODS FOR A BATTERY

(71) Applicant: Landmark Battery Innovations, Inc., Austin, AZ (US)

(72) Inventors: Viet Vu, Leander, TX (US); Ajoy Datta, Fullerton, CA (US); Lucien Fontaine, Cedar Park, TX (US); Andrew Parth, Austin, TX (US)

(73) Assignee: Landmark Battery Innovations, Inc., Austin, TX (US)

( * ) Notice: Subject to any disclaimer, the term of this patent is extended or adjusted under 35 U.S.C. 154(b) by 0 days.

(21) Appl. No.: 15/411,761

(22) Filed: Jan. 20, 2017

(65) Prior Publication Data

US 2017/0207432 A1 Jul. 20, 2017

Related U.S. Application Data

(60) Provisional application No. 62/281,159, filed on Jan. 20, 2016.

(51) Int. Cl.
*H01M 4/24* (2006.01)
*H01M 10/30* (2006.01)
*H01M 4/32* (2006.01)
*H01M 2/12* (2006.01)
*H01M 2/36* (2006.01)

(52) U.S. Cl.
CPC ............. *H01M 4/248* (2013.01); *H01M 4/32* (2013.01); *H01M 10/30* (2013.01); *H01M 2/1229* (2013.01); *H01M 2/367* (2013.01)

(58) Field of Classification Search
CPC ........ H01M 4/248; H01M 4/32; H01M 10/30; H01M 2/1229
See application file for complete search history.

(56) References Cited

U.S. PATENT DOCUMENTS 5,582,931 A * 12/1996 Kawakami ............. H01M 6/40
429/127

* cited by examiner

*Primary Examiner* — Helen Oi K Conley
(74) *Attorney, Agent, or Firm* — The Noblitt Group, PLLC

(57) ABSTRACT

A nickel iron battery comprising a housing, an electrolyte solution contained within the housing, an anode comprising iron configured to be retained within the housing and the electrolyte solution, an cathode comprising nickel configured to be retained within the housing and the electrolyte solution, and a separator configured to be retained within the hosing and the electrolyte solution, wherein the separator is interposed between the cathode and the anode.

20 Claims, 13 Drawing Sheets

SYSTEMS AND METHODS FOR A BATTERY

BACKGROUND OF THE TECHNOLOGY

Batteries are commonly used as electrical energy sources. A battery contains a negative electrode, typically called the anode, and a positive electrode, typically called the cathode. The anode contains an active material that can be oxidized. The cathode contains an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide the electrical power. The electrolyte in contact with both anode and cathode contains ions that flow through the separator between anode and cathode to maintain charge balance throughout the battery during charge and discharge.

A primary goal in designing a battery is long service life. Long service life really means the battery can provide high energy throughput. But high energy throughput is dependent on the battery discharge capacity, the electrode voltage as well as the number of cycles that the battery can be discharged.

The primary advantage of Nickel-Iron battery is high in cycle life. This means that the battery can be charged and discharged many times. The chief disadvantage of Nickel-Iron battery is, however, the poor rate capability because of the inherently low discharge voltage of the iron electrode. Low discharge voltage to a given end of discharge voltage cut off has resulted in low discharge capacity for the Nickel-Iron battery. Because the dischargeable capacity under a given load per cycle is determined by the length of time for the discharging battery to reach a predetermined cut off voltage at which the battery is no longer useful for its intended purpose.

Therefore, the energy throughput of Nickel-Iron battery can still be low even though its cycle life is known to be high. Any means to increase the discharge voltage of iron electrode to increase discharge capacity and energy throughput would bring significant commercial interest.

A common sense approach to increase energy throughput has been to increase the interior volume of the battery to allow for more active materials within the cell. More active material would surely bring longer discharge capacity and higher voltage due to lower current density on the iron anode, but increasing battery size also means lower energy density and higher cost.

A more beneficial approach to increase battery capacity to a given cut off voltage without resorting to the use of additional active material is employing an electro-conductive additive to enhance the discharge kinetic iron oxide anode. Therefore, the discharge voltage of iron oxide anode can be raised without resorting the use of additional iron oxide active material. The benefits of electro-conductive additive include higher battery energy density and higher energy throughput for Nickel-Iron battery.

SUMMARY OF THE INVENTION

A nickel iron battery comprising a housing, an electrolyte solution contained within the housing, an anode comprising iron configured to be retained within the housing and the electrolyte solution, an cathode comprising nickel configured to be retained within the housing and the electrolyte solution, and a separator configured to be retained within the hosing and the electrolyte solution, wherein the separator is interposed between the cathode and the anode.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

FIG. 1 representatively illustrates a cross section view of a sealing member;

FIG. 2 representatively illustrates an a battery/cell top cover with a sealing member located at opposite corners;

FIG. 3 representatively illustrates a perspective view of a battery cell with an electrolyte level and sealing member each located at opposite corners;

FIG. 4 representatively illustrates a cross section view of a battery cell with an electrolyte level;

FIG. 5 representatively illustrates a 90 degree orientation with an electrolyte level;

FIG. 6 representatively illustrates a second embodiment of a 90 degrees orientation with an electrolyte level;

FIG. 7 representatively illustrates iron oxide anode discharge with and without a Lithopone additive;

FIG. 8 representatively illustrates a cross section area of the separator with gas barrier;

FIG. 9 representatively illustrates formation cycles of nickel-iron cells with a gas barrier included and without;

FIG. 10 representatively illustrates layers of the catalyst system;

FIG. 11 representatively illustrates internal pressure of a Nickel-Iron cell during charge and overcharge with and without a catalyst layer FIG. 12 representatively illustrates a cross-section view of the elements of a battery, FIG. 13 representatively illustrates an advantage of Lithopone additive;

FIG. 14 representatively illustrates the various levels of Lithopone that may be added; and FIG. 15 representatively illustrates cycle life of iron oxide anode with Lithopone added.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various components such as anodes, cathodes, separators, electrolytes, and/or the like. In addition, the present technology may be practiced in conjunction with battery configurations, and the systems described are merely exemplary applications for the technology. Further, the present technology may employ any number of conventional techniques for capturing data, processing data, and the like.

The present disclosure discusses a battery cell which will not leak an electrolyte to the outside while venting of an internal gas continues when the battery cell, is tilted by up to 90 degrees on its side. The battery cell comprises an improved closure member, which will be non-spill-able or leak-proof when the battery cell is tilted by up to 90 degrees on its side.

In one embodiment, a leak proof battery cell comprises: a hollow plastic housing having an open end and a closed end, wherein the housing also comprises a cover plate that covers the closed end with two opposite ends and each end has one or more apertures configured to allow a gas to pass through and an electrolyte to be added to the battery cell; an electrode assembly located in the housing and comprising one or more positive electrode plate(s), one or more negative electrode plate(s), and an absorbent separator plate between the positive electrode plate(s) and negative electrode plate(s); and a volume of liquid electrolyte contained within the housing.

In a separate embodiment, the cover plate has two diagonally opposed corners and each corner has one or more apertures configured to allow a gas to pass through and an electrolyte to be added to the battery cell.

For the purposes of this disclosure, a battery cell can be any cell configured to contain an electrolyte. Also, a battery can comprise a single battery cell or a combination of battery cells.

In a separate embodiment, the battery cell is further configured to be leak-proof and capable of allowing a gas to vent and an electrolyte solution to be replenished. This can occur if a battery cell is overcharged, creating a gas which can generate pressure and cause an explosion. If the gas is allowed to vent to prevent such an explosion, the electrolyte solution must be replenished.

The leak-proof battery cell comprises two separate vent openings at opposite end corners, or at diagonal corners, of the container cover so that one vent opening is always open to provide the passage of internal gas and therefore prevent internal pressure to build up. The vent openings are sealed with a water repellant porous frit or micro-porous membrane through which gas passage is allowed but not the electrolyte. The sealing device for the vent opening sometimes is also referred to as a valve through which electrolyte can be replenished.

A leak-proof but porous membrane or frit is sealed in the space within the sealing device, also sometimes referred as a valve, which occupies the gas passage opening of the cover plate. The porous leak-proof micro-porous membrane or water-repellant porous frit will block the liquid electrolyte passage to the outside. As long as one of the two sealing devices is staying above the electrolyte level in the battery, the passage of gas will continue from the housing interior so that internal pressure will not build up to cause electrolyte leakage.

The two sealing device or valve system approach is simpler, more cost effective and can be implemented in confined spaces because it does not require a large electrolyte reservoir on top of the battery cover as prior art.

The two sealing device or valve system approach with micro-porous membrane or water-repellant frit will allow gas flow to be continuous and therefore no internal pressure will build-up when battery or cell is tilted by up to 90 degrees.

The material choice and structural design feature of the sealing valve member can include a micro-porous membrane like PTFE film or micro-porous frit like structure of PTFE, PE or PP micro-beads, or the like.

FIG. 1 shows a cross-section view of a sealing member. Shown are a vent plug with porous frit or membrane 101, gas flow 102, and a portion of a cover plate 103.

FIG. 2 shows a battery/cell top cover with a sealing member located at opposite corners. Shown are cover plate 103, a vent plug with porous frit or membrane 101, solid fill plug 201, and terminals 202.

FIG. 3 shows a perspective view of a battery cell with an electrolyte level and sealing member each located at opposite corners. Shown are a battery cell 300, cover plate 103, hollow plastic housing 301, vent plug with porous frits or membranes 101, terminals 202, a z-axis 303, and an x-axis 302. The battery cell is in a normal orientation, sitting flat on its base (bottom).

FIG. 4 shows a cross-section side view of a battery cell with an electrolyte level. Shown are battery cell 300, cover plate 103, hollow plastic housing 301 with closed end 402, vent plug with porous frits or membranes 101, terminals 202, and electrolyte 401. The battery cell is in a normal orientation, sitting flat on its base (bottom, closed end 402).

FIG. 5 shows a 90 degree orientation with an electrolyte level. Shown are battery cell 300, upper-most vent plug with porous frit or membrane 501, lower-most vent plug with porous frit or membrane 502, terminals 202, and electrolyte 401. The battery cell is rotated 90 degrees along the z-axis 303. The liquid level of the electrolyte 401, lies below the upper-most porous frit or membrane 501.

FIG. 6 shows a second embodiment of a 90 degrees orientation with an electrolyte level. Shown are battery cell 300, upper-most vent plug with porous frit or membrane 501, lower-most vent plug with porous frit or membrane 502, terminals 202, and electrolyte 401. The battery cell is rotated 90 degrees along the x-axis 302. The liquid level of the electrolyte 401, lies below the upper-most porous frit or membrane 501.

The invention aims to provide an improved closure member which will be non-spill-able or leak-proof when the battery or cell is tilted by 180 degrees on its side. This invention relates to a battery or cell which will not leak electrolyte to the outside while venting of internal gas continues when battery or cell is tilted by 180 degrees on its side.

The leak-proof battery or cell is provided with two separate vent opening at opposite end corners or the container cover so that one vent opening is always open to provide the passage of internal gas and therefore prevent internal pressure to build up. The vent openings are sealed with a water repellant porous frit or micro-porous membrane through which gas passage is allowed but not the electrolyte. The sealing device for the vent opening sometimes is also referred to as a valve through which electrolyte can be replenished.

The battery or cell comprises a generally hollow plastic housing having an open end and a closed end. An electrode assembly is contained within the housing and includes positive electrode plates, negative electrode plates and an absorbent separator plate between the positive and negative electrode plates. A quantity of liquid electrolyte solution is contained within the housing, and a plastic cover plate provides sealing to secure the housing open end. The cover plate has two gas passage apertures located at the opposite end corners for the passage of gas and also for the replenishing of electrolyte if needed.

A leak-proof but porous membrane or frit is sealed in the space within the sealing device sometimes referred also as valve which occupies the gas passage opening of the cover plate. The porous leak-proof micro-porous membrane or water-repellant porous frit will block the liquid electrolyte passage to the outside. As long as one of the two sealing devices is staying above the electrolyte level in the battery, the passage of gas will continue from the housing interior so that internal pressure will not build up to cause electrolyte leakage.

The two sealing device or valve system approach is simpler, more cost effective and can be implemented in confined spaces because it does not require a large electrolyte reservoir on top of the battery cover as prior art.

The two sealing device or valve system approach with micro-porous membrane or water-repellant frit will allow gas flow to be continuous and therefore no internal pressure build-up when battery or cell is tilted by 180 degrees.

The material choice and structural design feature of the sealing valve member can include micro-porous membrane like PTFE film or micro-porous frit like structure of PTFE, PE or PP micro-beads.

Further, if a battery is overcharged, the gas generated can cause the battery to explode. If the gas is allowed to vent to prevent such an explosion, the electrolyte solution must be replenished. It is therefore an object of the present invention to provide a leak-proof battery and cell that will allow gas to vent and the electrolyte solution to be replenished.

The present disclosure discusses a nickel-iron battery that utilizes nickel in the cathode and iron in the anode. Various embodiments are described that improve upon the basic functionality of the nickel-iron battery.

In one embodiment a nickel-iron battery comprises: a housing; an electrolyte solution in contained in the housing; an anode containing iron that resides in the housing and the electrolyte solution; a cathode containing nickel that resides in the housing and the electrolyte solution; and a separator that resides in the housing and the electrolyte solution, and is interposed between the cathode and the anode.

In a separate embodiment, the electrolyte is alkaline.

In a separate embodiment, the anode comprises iron oxide combined with a barium salt-sulfide compound. The barium salt-sulfide compound can be 1-10 weight percent of the anode.

In one embodiment, the nickel-iron battery anode of the present invention comprises an active anode material such as iron oxide and an anode additive comprising a pore former barium compound, such as barium sulfate and an electrically conductive sulfide compound such as zinc sulfide, iron sulfide, copper sulfide, or the like. The barium salt-sulfide compound mixture additive can be added in amount of 1% up to 10% by weight of the active iron oxide anode materials. Barium salt compound, when used with an electrically conductive material such as sulfides, acts to promote higher discharge voltage for the iron oxide anode via porosity enhancement and electrical conductivity improvement. The electrical conductive sulfides can be deposited on surface of the barium salt or intimately mixed together with the barium compound during processing of the anode active mixture.

Alternatively, the barium salt-sulfide compound additive for iron oxide anode described in the present invention can be found commercially and is available as a pigment called Lithopone. Lithopone is an insoluble mixture of barium sulfate and zinc sulfide that precipitates upon mixing solutions of barium sulfide and zinc sulfate. The precipitate is recovered by filtration then calcined at temperatures above 600° C. The final mixture comprises of 29.4 wt % of ZnS and 70.6 wt % of BaSO$_4$.

In a separate embodiment, the separator comprises two layers (herein referred to as a double layer separator). The double layer separator has at least one layer described as a gas barrier that will not allow the charge and overcharge gases to be consumed at neither negative nor positive electrode.

Nickel-iron batteries have been known for over a hundred years. These batteries are based on the use of a nickel hydroxide active material as the cathode paired with an iron oxide as the anode. Various types of cell construction are possible for Nickel-Iron batteries. These variations in cell construction include both positive and negative electrodes in pocket plate, sintered plate and foam-based plate.

In all cell construction types, a separator is placed between the positive and negative electrodes to prevent short circuits. The separator used in the cell construction depends on the types of electrodes used. In cells with pocket plate electrodes, the anode and cathode are kept electrically isolated by a rigid spacer or a grid-like mesh inlay frame. The open space between the electrodes allows for hydrogen and oxygen gas to diffuse away from the electrodes freely so it will not interfere with ionic transport and the electrochemical reactions at the electrode-electrolyte interface. The construction of these cells requires large inter-electrode spacing imposed by the rigid grid support which limits high rate performance and yields low energy density.

Small inter-electrode spacing improves battery energy density, but when electrodes are held closely in place under compression they do have multiple disadvantages. For example the active material can become dislodged from the electrodes as a result of expansion and contraction of the electrode during cycling which can lead to internal short. To minimize incidents of internal short a woven or non-woven microporous fabric is placed between the positive and negative electrode with applied pressure to minimize the loss of active material from the electrodes. The woven or non-woven separators help maintain the integrity of the electrode through compression in addition to keeping the anode and cathode electrically isolated while providing good ionic contact through the electrolyte absorbing in the pores.

However, by providing intimate contact between electrode surface and separator, the pressurized gases generated at the electrodes can get trapped in the pores of woven or non-woven separators to interfere with the ionic transport and react with the active materials in the electrode to adversely affect the battery performance.

The generation of gas is the consequence of charging and overcharging when water is decomposing at anode and cathode and then consumed at the opposite electrodes.

The generation of gas is especially significant in Nickel-Iron batteries.

At the iron oxide anode (negative electrode) water is simultaneously reduced into hydrogen gas during charge competitively with the reduction of iron oxide into iron metal at nearly the same potential:

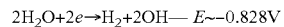
$2H_2O+2e \rightarrow H_2+2OH-$  $E \sim -0.828V$

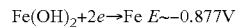
$Fe(OH)_2+2e \rightarrow Fe$  $E \sim -0.877V$

Trapped hydrogen gas in the pores of woven and non-woven separator can be consumed at the cathode (positive electrode) which can lead to capacity loss at the cathode:

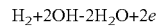
$H_2+2OH-2H_2O+2e$

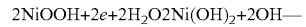
$2NiOOH+2e+2H_2O 2Ni(OH)_2+2OH-$

As the net reaction at charged cathode, hydrogen is consumed and reduces charged nickel oxide cathode as follows:

$H_2+2NiOOH 2Ni(OH)_2$

At the cathode (positive electrode) during overcharge oxygen gas is generated by breaking down of the electrolyte. Nickel oxide cathode has higher charge acceptance than iron oxide anode during formation stage. This leads to premature oxygen evolution at the cathode before iron oxide reaches the full charge state. The evolved oxygen at cathode can be consumed at the anode when trapped in the separator pores:

$$4OH^- - O_2 + 2H_2O + 4e$$

Trapped oxygen gas in the pores of woven and non-woven separator can be consumed at the anode (negative electrode) as follows that can lead to significant capacity loss at the anode:

$$Fe + \tfrac{1}{2}O_2 + H_2O \rightarrow Fe(OH)_2$$

Loss of charge capacity due to the evolved gasses during formation of Nickel-Iron cell has resulted in slow formation. Therefore, the activation of iron oxide anode in nickel-iron cell during formation may take 20-50 cycles to complete.

Historically Nickel-Iron is expensive to manufacture just because the cost of formation and activation of Nickel-Iron battery is very high. As mentioned, Nickel-Iron typically requires 20-50 cycles to complete the formation because of the iron electrode inefficiency and the related gas consumption phenomena. When charge acceptance of nickel cathode is higher than iron anode, oxygen can prematurely evolve at the cathode and then be consumed at the anode. As this process continues the cell capacity is progressively depressed by the delayed anode capacity therefore, formation and activation of nickel-iron cell is a very time consuming activity.

The present disclosure describes a multi-layer separator designed to prevent the moving of gases from anode to cathode and from cathode to anode during charge while cell stack is under pressure. Nickel-Iron batteries and cells containing such a separator would have significant economic value because of faster formation and higher capacity can be reached in shorter time.

In another embodiment, the gas barrier is provided as a laminated or non-laminated separated layer to the separator for placement between a nickel positive electrode and an iron negative electrode.

In a separate embodiment, the gas barrier is provided as an over-coated layer on top of the separator for placement between a nickel positive electrode and an iron negative electrode.

The preferred materials for gas barrier include hydrophilic film former such as polyvinyl alcohol, cellophane, hydroxyl-propyl alcohol, and hydroxyl methyl propyl alcohol and polymers, and the like.

In a separate embodiment, the nickel-iron battery further comprises a catalyst system configured to catalytically combine hydrogen with hydroxide ions to form water. The catalyst system does not contain a noble metal such as copper, silver, gold, or platinum.

A major problem of sealing batteries is the control of the gas pressure.

The oxygen recombination cycle in sealed batteries can be achieved by starved electrolyte design with excess anode capacity, but cycle life and charge acceptance are significantly compromised in comparison to the flooded type.

The hydrogen recombination cycle, however, cannot be achieved successfully because hydrogen oxidation is kinetically hindered at the working potential of the positive electrode. Therefore, hydrogen evolution is usually suppressed instead by designing with excess anode capacity which can bring higher cost and lower performance.

Hydrogen suppression via excess anode capacity is much more difficult for nickel-iron battery because during charge hydrogen can evolve simultaneously on iron anode. Therefore, an inexpensive catalyst system will have significant economic value when used with Nickel-Iron battery.

The catalytic hydrogen recombination principle has been proposed for lead/acid batteries via noble catalyst with auxiliary electrode held at special potentials by means of diodes connected to the battery electrodes. There are obstacles including complicated voltage control and high cost of noble metal catalyst that prevent this to have industrial application on a large scale.

Hydrogen can be oxidized electrochemically at a catalyzed auxiliary electrode by catalytic means together with oxygen. The catalytic oxidation rate is sufficient to have adequate pressure condition for ultra-low maintenance Nickel-Iron battery:

$$O_2 + 2H_2O + 4e OH^-$$

$$2H_2 + 4OH^- - H_2O + 4e$$

Net reaction: $O_2 + 2H_2 \rightarrow 2H_2O$

As described by the reactions, for the catalytic mixture to work efficiently it should have sufficient electrical conductivity and should also contain both catalyst components for hydrogen and oxygen to react electrochemically.

The aim of this invention is to develop a low cost non-noble catalyst system to recombine both hydrogen and oxygen in the gas phase for nickel-iron batteries.

Gas phase hydrogen/oxygen recombination by catalysis, however, is not restricted to flooded batteries alone. Sealed types with immobilized and starved electrolytes can still have catalyst in the gas phase as an additional measure to enhance the recombination of oxygen/hydrogen in extreme voltage range. The real advantages of catalytic recombination include the elimination water loss in cells using aqueous electrolyte and the prevention of excessive gas pressure in the cell.

Hydrogen gas evolves prematurely during charge and overcharge of iron anode in nickel-iron battery due to proximity of iron anode potential versus hydrogen.

$$2H_2O + 2e \rightarrow H_2 + 2OH^- \quad E \sim -0.828V$$

$$Fe(OH)_2 + 2e \rightarrow Fe \quad E \sim -0.877V$$

It has been shown that noble metal-free catalyst material based on tungsten carbide can be effective catalyst to recombine hydrogen in Lead Acid battery. Tungsten-Carbide catalytic mixture is prepared by mixing tungsten-carbine powder with high-surface-area carbon and PTFE powder. Both carbon and PTFE powder are required for the electrical conductivity and the three-phase reaction zone for the transfer of charge between solids, gases and electrolyte.

For Nickel-Iron battery oxygen gas can evolve prematurely also due to the lower charge acceptance nature of the iron anode in comparison to the nickel oxide cathode. Oxygen gas evolves at the cathode when cathode reaches the overcharge sooner than the anode during charge. Therefore, for nickel-iron battery oxygen recombination by catalytic means is highly desirable to maintain low rate of water loss. Catalytic recombination of hydrogen and oxygen inside the battery can return of the water to electrolyte:

$$O_2 + 2H_2O + 4e \leftarrow \rightarrow 4OH^-$$

$$2H_2 + 4OH^- \leftarrow \rightarrow 4H_2O + 4e$$

Net reaction of returning of water to the electrolyte:

Net reaction: $O_2 + 2H_2 \rightarrow 2H_2O$

Metal oxide like manganese dioxide is an effective catalyst to recombine oxygen gas. The oxygen recombination catalytic mixture is mixed by combining high surface area carbon with a transition metal oxide like manganese compound. Alternative non-noble metal oxide may be nickel oxide also.

The present invention provides economic and effective means to recombine hydrogen and oxygen gas simultaneously during charge and overcharge of Nickel-Iron battery.

A multi-layer catalytic recombination of catalysts can replenish the water content of the electrolyte by recombining both hydrogen and oxygen.

When hydrogen gas encounters the catalyst layers in the presence of oxygen gas, hydrogen is oxidized to water and the catalyst is reduced. Oxygen interacts with catalyst to oxidize the catalyst back to natural state. Examples of hydrogen catalyst include Tungsten-Carbide, Ru metals, oxides, salts or mixtures thereof. When oxygen encounters the catalyst layers in the presence of hydrogen gas, oxygen is reduced to water and the transition metal catalyst is oxidized. Hydrogen interacts with the transition metal catalyst and restore the catalyst back to the natural state. Examples of non-noble hydrogen oxidizing materials include, but are not limited to, $MnO_2$, $Mn_2O_3$, $MnOOH$, $Mn_3O_4$, $BaO_2$, $CuO$, $KMnO_4$, manganese phosphate and bismuth trioxide.

Preferably, the hydrogen recombination catalyst to include between 10% to 20% weight percent activating Tungsten-Carbide catalyst together with 15% to 30% weight percent of high surface area carbon and the balance with PTFE binder. Suitable binder-like PTFE materials are permeable to hydrogen, oxygen, and water vapor.

The transition metal-oxide recombination catalyst can include 10% to 30% manganese compound, which is mixed in with high surface area carbon in an amount of 10% to 20% by weight. The binder includes PTFE would make up the balance.

Alternatively, the metal oxide transition catalyst can also be prepared by decomposing $KMnO_4$ directly on to conductive carbon with $NaBH_4$ before mixing in with PTFE binder.

FIG. 7 shows iron oxide anode discharge with and without a Lithopone additive. Shown are data without the Lithopone additive 701, 1% Lithopone additive 702, 3% Lithopone additive 703, and 5% Lithopone additive 704.

FIG. 8 shows a cross section area of the separator with gas barrier. Shown are an anode 801, cathode 802, a first separator layer 803, and a second separator layer 804.

Figure 1:
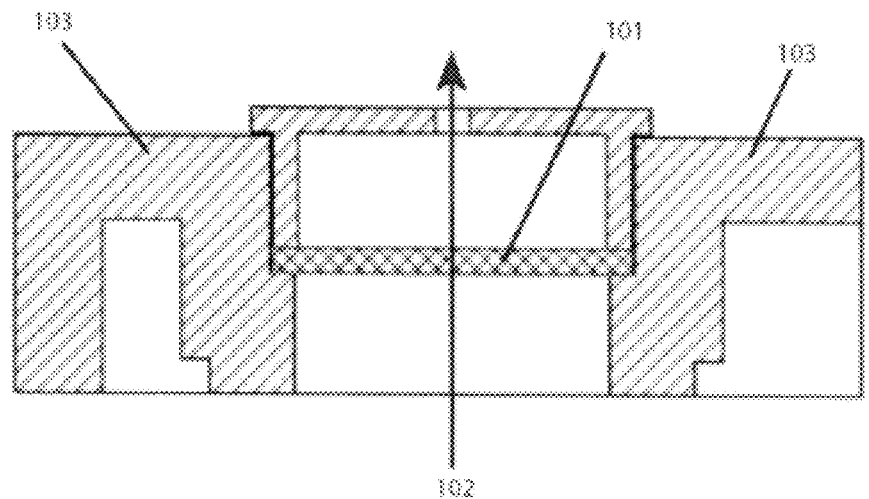
Figure 2:
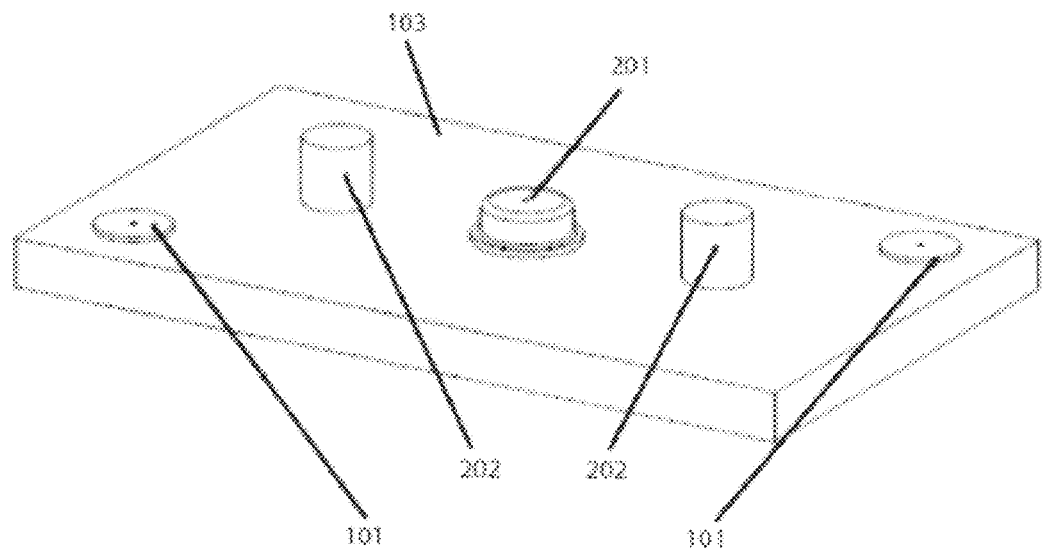
Figure 3:
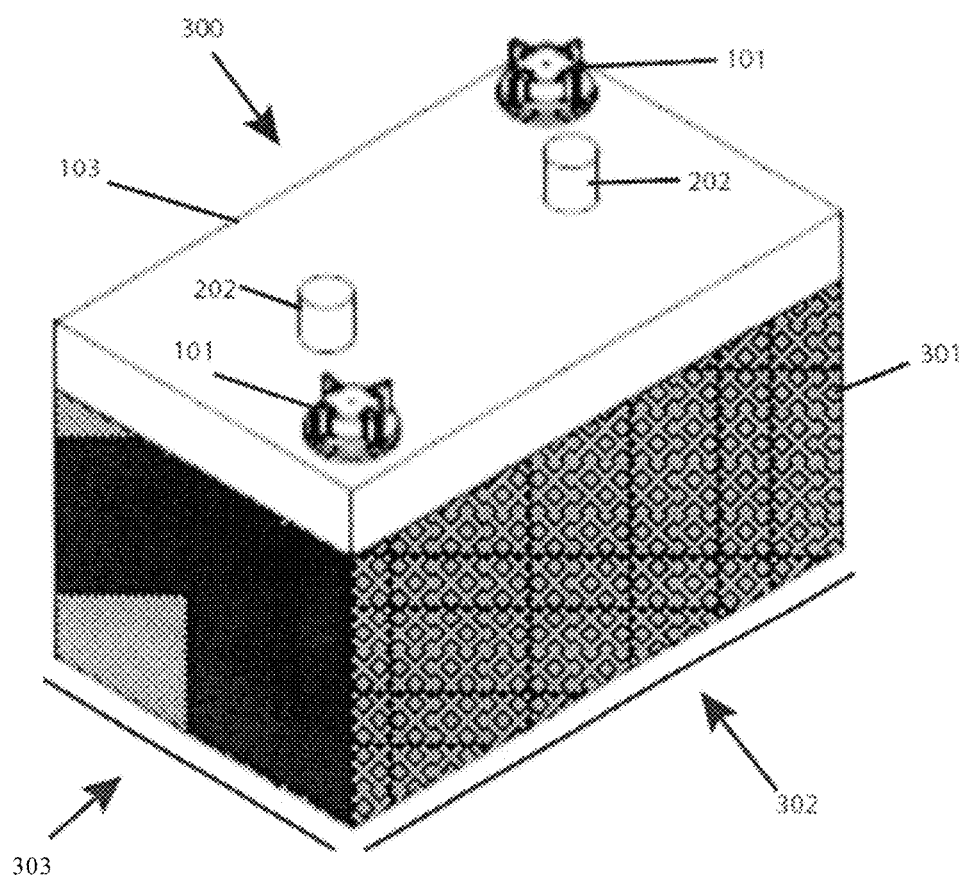
Figure 4:
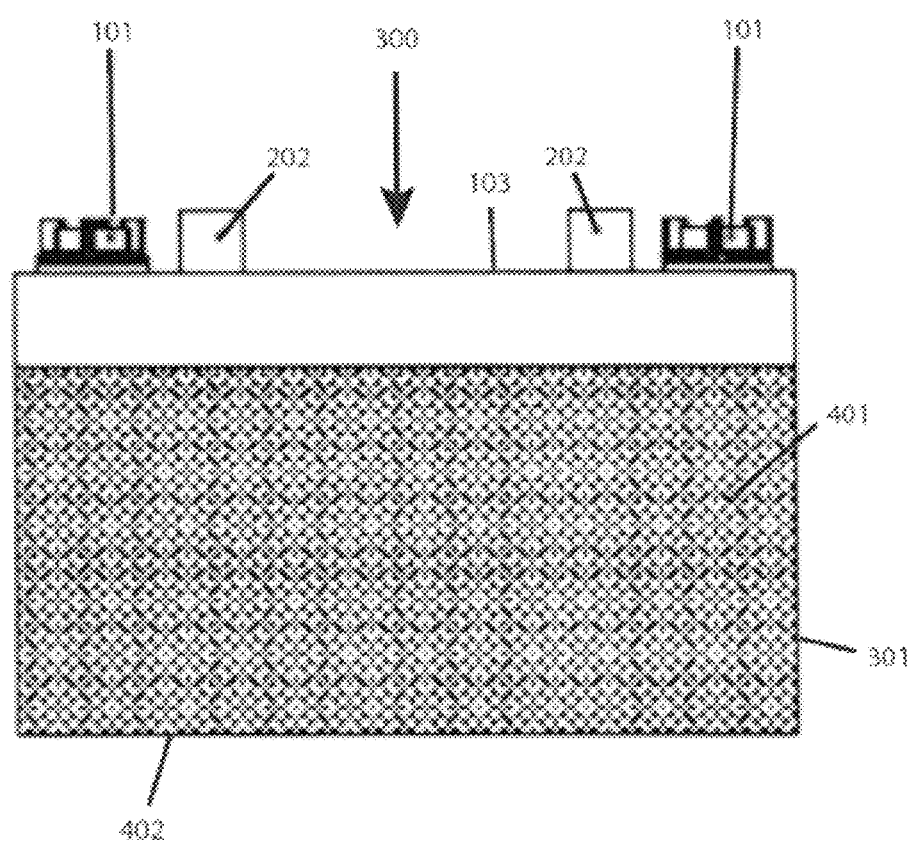
Figure 5:
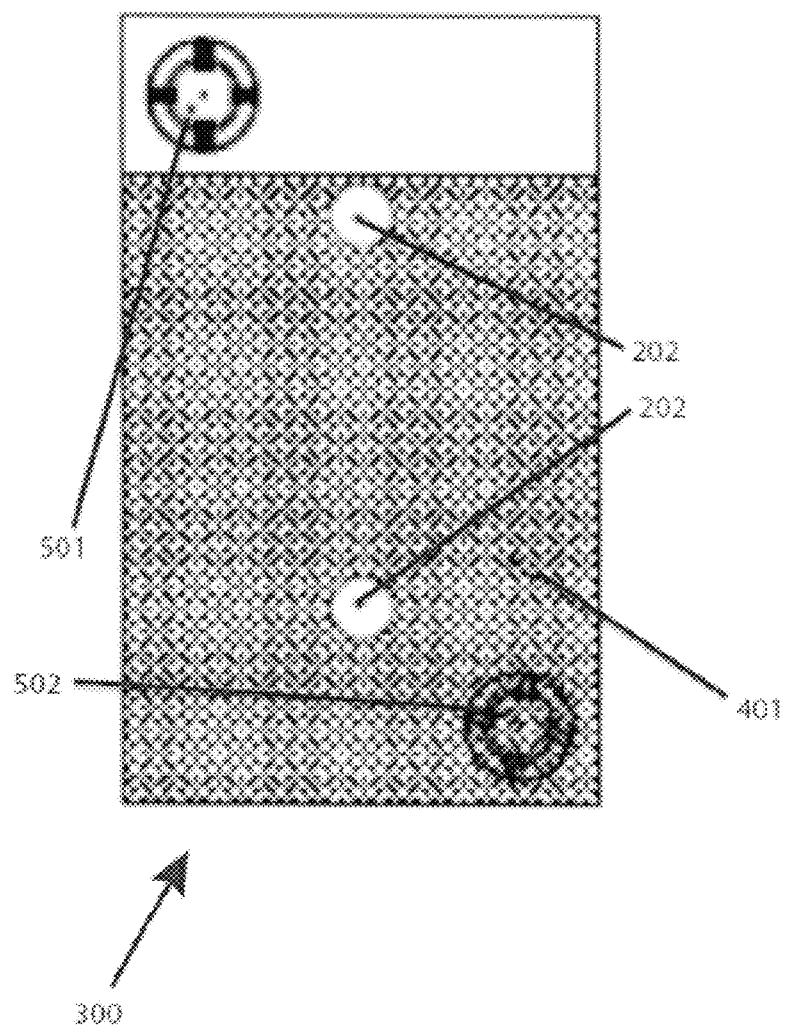
Figure 6:
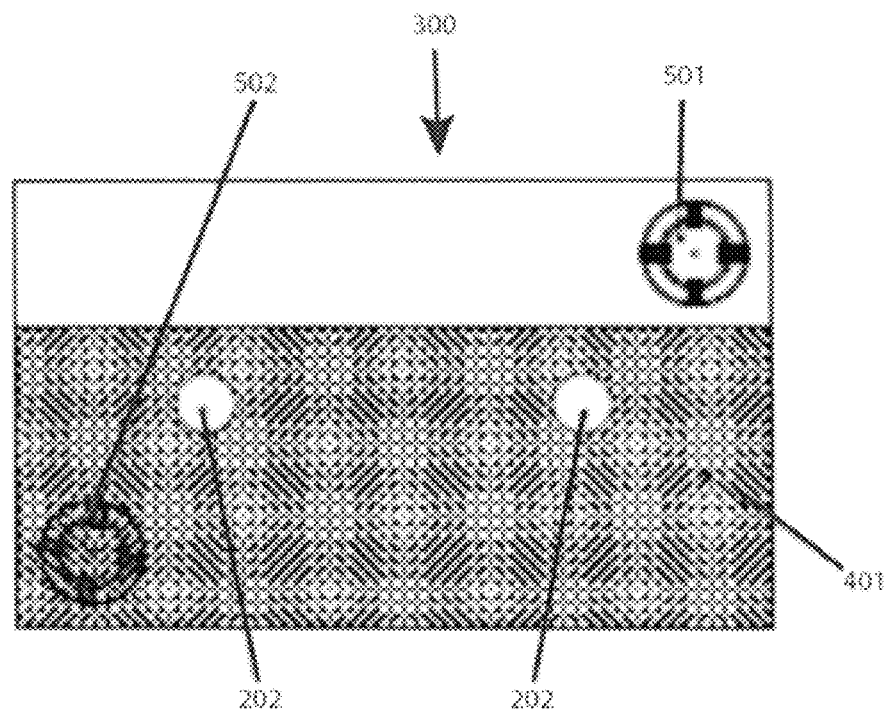
Figure 7:
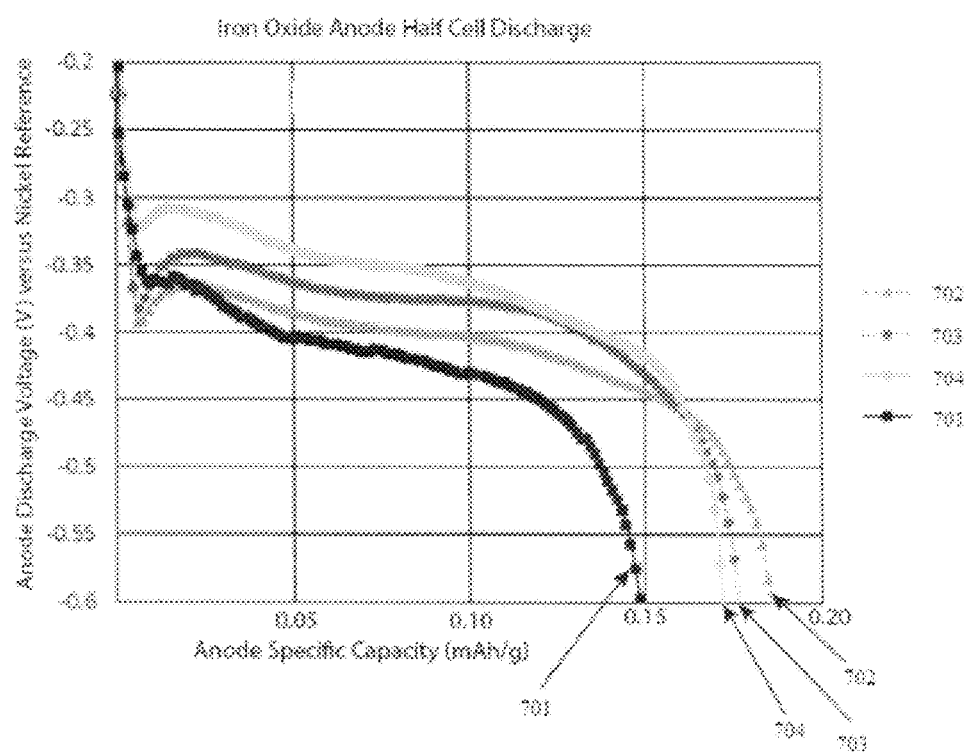
Figure 8:
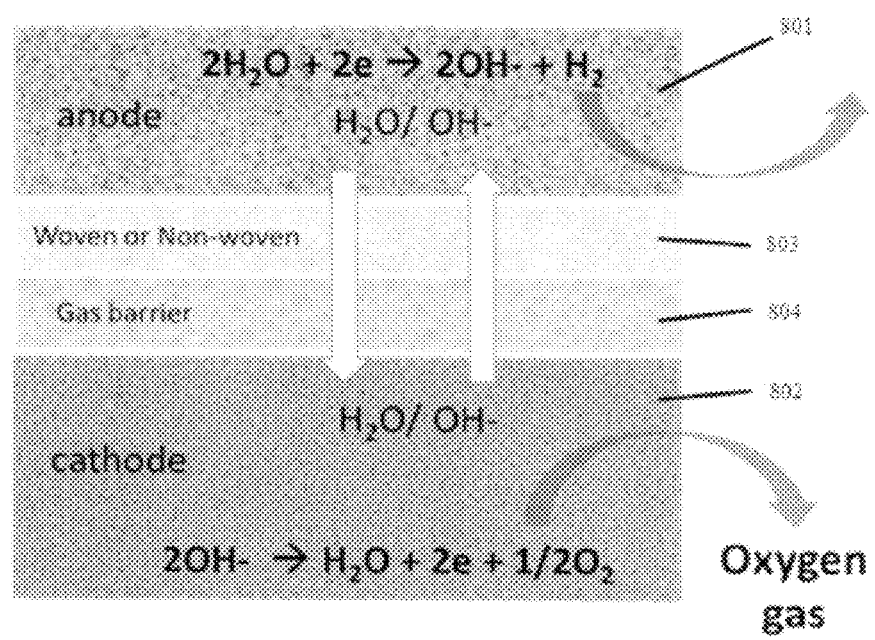
Figure 9:
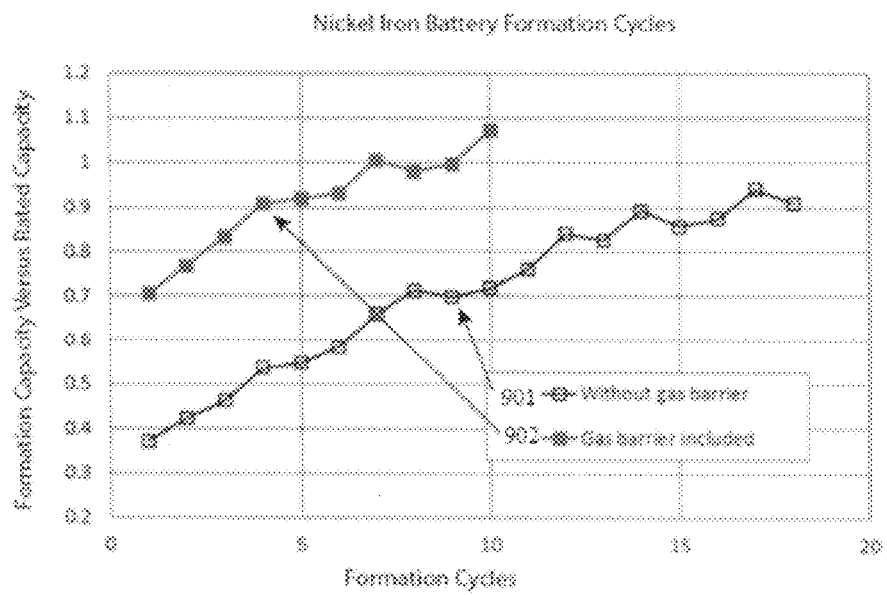
FIG. 9 shows formation cycles of nickel-iron cells with a gas barrier included and without. Shown are data without a gas barrier 901 and data with a gas barrier 902.
Figure 10:
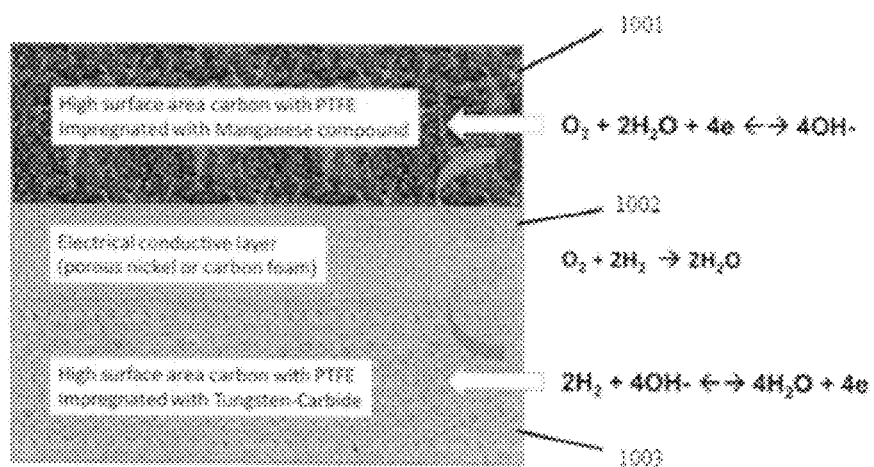
FIG. 10 shows layers of the catalyst system. Shown are a layer comprising high surface area carbon with PTFE impregnated with a manganese compound 1001, an electrical conductive layer such as porous nickel or carbon foam 1002, and a layer comprising high surface area carbon with PTFE impregnated with a Tungsten-Carbide 1003.
Figure 11:
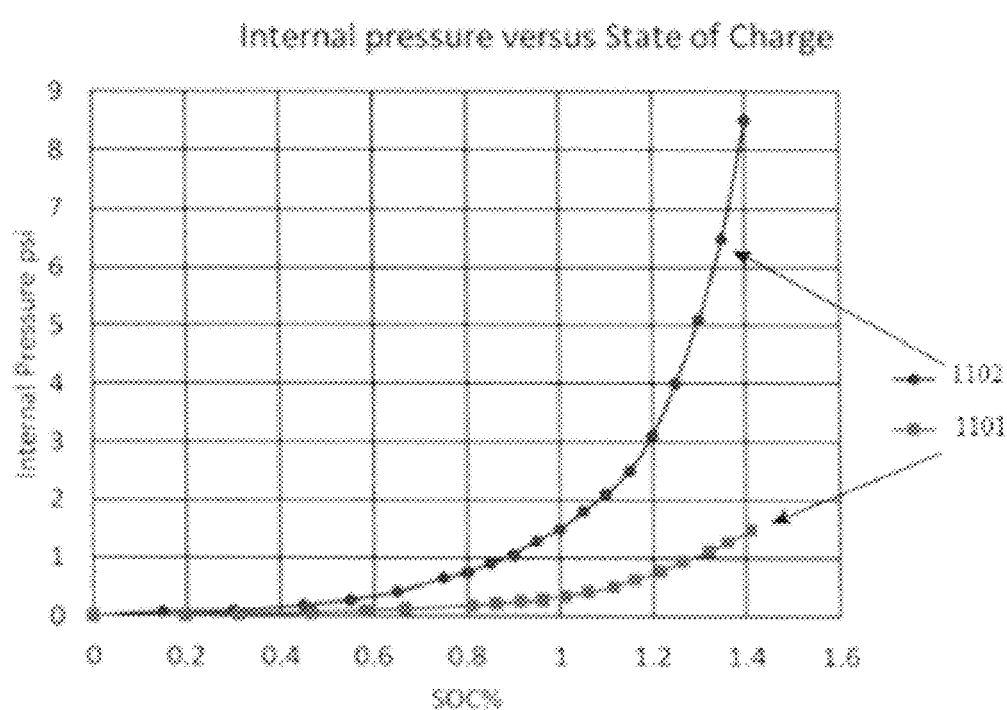
FIG. 11 shows internal pressure of a Nickel-Iron cell during charge and overcharge with and without a catalyst layer. Shown are data with a catalyst 1101 and data without a catalyst 1102.
Figure 12:
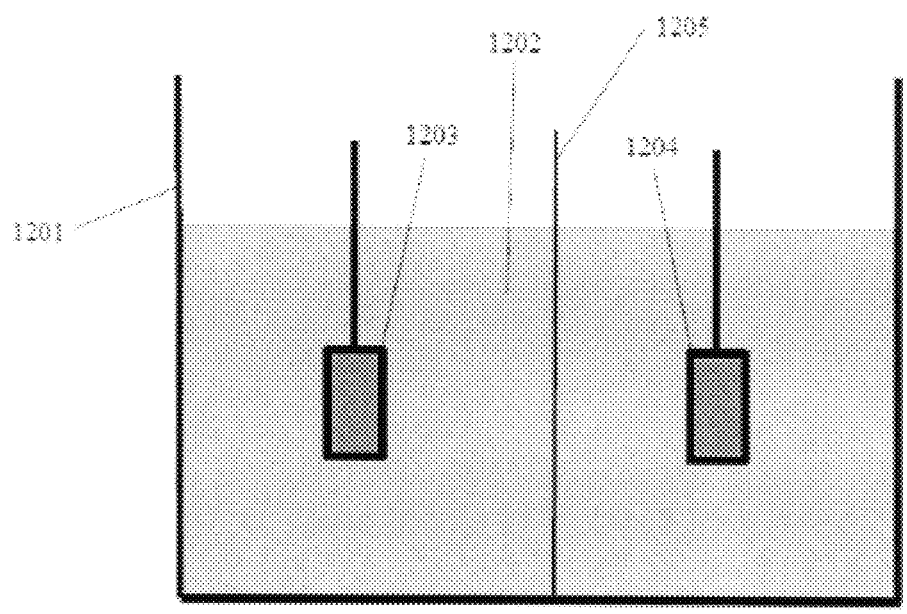

FIG. 12 shows a cross-section view of the elements of a battery. Shown are a housing 1201; an electrolyte solution 1202 contained in the housing; an anode containing iron 1203 that resides in the housing and the electrolyte solution; a cathode containing nickel 1204 that resides in the housing and the electrolyte solution; and a separator 1205 that resides in the housing and the electrolyte solution, and is interposed between the cathode and the anode. In this embodiment, a lid or top for the battery is not shown but other embodiments could include a lid or top to prevent the electrolyte from spilling if the battery is tipped.

Separator System for Nickel Iron Battery

The present invention is in the field of energy storage devices. More particularly, it is a nickel-iron rechargeable battery using alkaline electrolyte containing sulfur or sulfide additives in the electrolyte.

Provided is a Nickel-Iron battery comprising a multi-layer separator. The multi-layer separator has at least one layer described as a barrier layer that will not allow both iron and gas to cross over to the opposite electrodes, but the electrolyte including hydroxyl ion and water are freely to cross over.

Nickel-iron batteries have been known for over a hundred years. These batteries are based on the use of a nickel hydroxide active material as the cathode paired with an iron oxide as the anode. Various types of cell construction are possible for Nickel-Iron batteries. Variations in cell construction include both positive and negative electrodes as pocket plate, sintered plate and foam-based plate.

In all cell construction types, a porous separator like non-woven, woven or an open plastic grid like a mesh structure is placed between the positive and negative electrodes to prevent short circuits. The separation must provide sufficient distance to prevent electrical short.

Iron oxide in Nickel-Iron battery has low solubility in alkaline electrolyte, however, the nickel hydroxide cathode material in the battery is extremely sensitive to iron contamination. Nickel hydroxide cathode reversibility can drop as much as 10% at iron contamination level as low as 1000 ppm. This can have a significant adverse effect on energy density of the battery as well as the cycle life and top up maintenance routine for the battery.

Iron oxide dissolves in alkaline electrolyte by the following reaction:

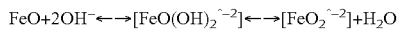

The soluble iron species ($FeO_2^{-2}$) are free to migrate across the separation distance between electrodes to the cathode side and cause nickel hydroxide cycle efficiency to degrade. This process is known as iron poisoning effect in Nickel-Iron battery.

Nickel hydroxide is sensitive to iron contamination because iron material has very low gassing over voltage in comparison to the nickel material, therefore it is much easier for the nickel cathode to evolve gas during charge in the presence of iron contamination. The evolution of gas during charge reduces the charge acceptability of nickel hydroxide and degrades the ampere-hour reversibility.

Gas generation rates are significant in Nickel-Iron batteries. Gas evolution is the consequence of charging and overcharging when water is decomposing at the anode and cathode.

At the iron oxide anode, water is simultaneously reduced into hydrogen gas during charge competitively with the reduction of iron oxide into iron metal at nearly the same potential:

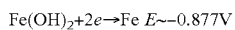

Dissolved hydrogen gas migrates through the open pores of woven and non-woven separator to be consumed at the nickel cathode side resulting in a capacity loss:

$$H_2 + 2NiOOH \rightarrow 2Ni(OH)_2$$

At the cathode side, oxygen gas is generated by breaking down of the electrolyte during overcharge:

$$4OH^- \rightarrow O_2 + 2H_2O + 4e$$

Dissolved oxygen gas migrates through the pores of woven or non-woven separator to be consumed at the anode resulting in a capacity loss:

$$Fe + \tfrac{1}{2}O_2 + H_2O \rightarrow Fe(OH)_2$$

Capacity loss by crossing over of gas can have significant adverse effect on the economic value for Nickel-Iron battery. Because gas consumption at opposite electrodes can reduce the cycle efficiency and delay the capacity pick up during formation resulting in longer formation time and higher manufacturing cost.

Provided is a Nickel-Iron battery comprising a positive electrode, a negative electrode, an electrolyte, and a separator placed between the positive and negative electrodes. The separator has at least one layer described as a non-porous 100% solid barrier plastic film that will not allow the crossing of iron and gases to the opposite electrodes, but will allow the crossing of electrolyte freely for the battery reactions. The barrier polymer film is provided as a single layer 10-100 microns thick that can be used alone or with a thicker 100-600 microns non-woven as the supporting layer. Alternate embodiment of the invention can include the use of the barrier as separated multilayers with or without lamination to the non-woven layer. The barrier film can also be used as an over coat from a solution phase on top of the porous non-woven layer.

FIG. 12 shows a cross section area of electrodes/separator. The separator includes a barrier layer. The barrier layer is a non-porous 100% solid polymer film 0.02-0.10 mm thick with a non-woven layer 0.1-0.6 mm thick as supporting layer. The total thickness of the multilayer separator is 0.12-0.70 mm thick which is significantly thinner for higher capacity cell volume than common practice at 1.3-3.1 mm.

The preferred barrier material should be 100% solid non-porous hydrophilic film former including polyvinyl alcohol, cellophane, hydroxyl-propyl alcohol, hydroxyl methyl propyl alcohol and polymers alike. The barrier material may include a thickener like carboxyl-methyl cellulose (CMC) for viscosity control.

It has been shown that both noble metal and noble metal-free catalyst materials such as platinum black and tungsten-carbide (WC) can be effective catalyst to recombine hydrogen. Platinum black has been used widely as catalyst for hydrogen electrode in fuel cell. Tungsten-Carbide has been shown to be effective hydrogen recombination catalyst for Lead-Acid battery. The catalytic mixture is prepared by mixing the catalyst such as Platinum black or Tungsten-Carbide powder with high-surface-area electronic conductor material like activated carbon and Teflon® powder as the binder. Activated carbon and Teflon® are providing the electrical conductivity and suitable media for the adsorption of gas in the three-phase reaction zone. The transfer of electrical charge between solids, gases and liquid electrolyte need to occur simultaneously.

In Nickel-Iron battery, oxygen gas can evolve prematurely on nickel oxide cathode when the cathode reaches higher state of charge sooner than the iron anode. This happened because charge acceptance on the nickel cathode side is always higher than the iron anode side. Nickel cathode does not have the similarity of potential between nickel and oxygen like iron and hydrogen. Therefore, nickel cathode always reaches higher state of charge before iron anode in Nickel-Iron battery. Higher state of charge on nickel cathode means oxygen will evolve before Nickel-Iron battery reaches the full state of charge.

Therefore, Nickel-Iron battery will require both hydrogen and oxygen recombination by catalytic means more than any other battery chemistry. It is highly desirable to do so to maintain the lowest rate of water loss because catalytic recombination of both hydrogen and oxygen inside the battery can return water to the electrolyte:

$$O_2 + 2H_2O + 4e \leftarrow \rightarrow 4OH^-$$

$$2H_2 + 4OH^- \leftarrow \rightarrow 4H_2O + 4e$$

Net reaction of returning of water to the electrolyte:

$$O_2 + 2H_2 \rightarrow 2H_2O$$

Metal oxide like manganese dioxide is an effective catalyst to recombine the oxygen gas. Manganese compound such as manganese sulfate of manganese dioxide have been used widely as oxygen reduction catalyst on the cathode side of metal air battery. The oxygen recombination catalytic mixture is prepared by mixing high surface area activated carbon as the conductor with transition metal oxide like manganese compound and Teflon® as the binder. Alternative transition metal oxide like nickel oxide is also very effective.

Both hydrogen and oxygen gas can be recombined simultaneously during charge and overcharge of Nickel-Iron battery by the donor-acceptor system of catalysts. The multi-layer including both donor-acceptor type of catalysts for hydrogen and oxygen can replenish water to the electrolyte and reduce the battery maintenance cycle. When hydrogen gas encounters the hydrogen catalyst layer, hydrogen is oxidized and the catalyst is reduced. Uncatalyzed available oxygen interacts with catalyst to revert catalyst back to the natural state. Examples of effective hydrogen oxidation catalyst include Platinum black, Tungsten-Carbide, Ru metals, oxides, salts or mixtures thereof.

When oxygen encounters the oxygen catalyst layer, oxygen is reduced and the transition metal catalyst is oxidized. Uncatalyzed available hydrogen interacts with the transition metal catalyst to restore catalyst back to the natural state. Examples of effective oxygen catalyst materials include $MnO_2$, $Mn_2O_3$, $MnOOH$, $Mn_3O_4$, $BaO_2$, $CuO$, $KMnO_4$, manganese sulfate, manganese phosphate and bismuth tri-oxide.

| | |
|---|---|
| Hydrogen catalyst layer 1 g/dm2 to 3 g/dm2 Effective thickness 0.2 to 0.6 mm | Hydrogen sensitive catalyst (Platinum black) 5% to 10% by weight Conductive carbon (activated carbon) 50% to 70% by weight Teflon powder 30% to 40% |
| Oxygen catalyst layer 1 g/dm2 to 3 g/dm2 Effective thickness 0.2 to 0.6 mm | Oxygen sensitive catalyst (Manganese dioxide) 5% to 10% Conductive carbon (activated carbon) 50% to 70% Teflon powder 30% to 40% |
| Electrical conductive layer placed between the catalyst layers 30 mg/cm2 to 40 mg/cm2 | The electrical conductive layer is a porous metal substrate like foam nickel or screen mesh nickel |

In the present invention, we improved the discharge voltage of iron oxide anode by adding to the iron oxide anode a mixture of ionic conductive additive together with an electronic conductive additive.

The ionic-electronic conductive additive comprising barium sulfate and a sulfide. The mixture of barium sulfate and a sulfide can be added separately to the iron oxide anode during preparation of the anode or compounded together homogeneously before adding to the iron oxide anode. Electronic conductive sulfides may include zinc sulfide, iron sulfide and copper sulfide.

Example of the iron oxide anode in this invention could be as follows:
Iron oxides 80-85%
Barium sulfate-sulfide compound 3-5%
Carbon black-graphite 9-11%
Organic binders 2-3%
Electrolyte 2-3%

Barium sulfate has very low solubility in water and much less so in Nickel-Iron battery electrolyte:

$$K_{sp}=[Ba^{2+}]_6[SO_4^{2-}]_e=1.1\times10^{-10}$$

Therefore, barium sulfates remain essentially solid particles inside iron oxide anode, but they carry abundant surface charge to support and promote the ionic conductivity needed for the electrolyte to access the anode discharge reaction. The role of Barium sulfates is therefore to provide and promote the ionic conductivity inside the iron anode electrode via enhancing electrolyte adsorption.

Sulfides on the other hand are excellent electronic conductor in comparison to iron oxide anode material as shown below

TABLE A

| | Description | Electrical resistivity Ohm-m |
|---|---|---|
| Iron metal | Metal | $9.9\times10^{-8}$ |
| Iron oxides (magnetite) | Fe3O4 | $>10^{+4}$ |
| Zinc sulfide | ZnS semiconductor | $<10^{+2}$ |
| Iron sulfide | FeS p-type metal | $<10^{-1}$ |
| Copper sulfide | CuS p-type metal | $<10^{-3}$ |

Due to extremely low solubility nature of all sulfides, the presence of sulfides enhances the electronic conductivity of the anode by connecting the iron oxide particles together for a more complete discharge. In other word the electronic bridges created by the sulfides provided deeper discharge or more capacity to a given cut off voltage.

The barium sulfate-sulfide compound mixture additive can be added in an amount of 1% up to 5% by weight of the active iron oxide anode materials. Barium sulfate alone is an excellent ionic conductor, but when used together with an electrically conductive material such as sulfides had shown to promote higher discharge voltage for the iron oxide anode because of the enhanced ionic and electronic conductivity within the iron oxide anode. The electrical conductive sulfides can be deposited on surface of iron oxide via a separated mixing step or intimately mixed together with the barium compound during processing of the anode active mixture.

Alternatively, the barium sulfate-sulfide compound additive for iron oxide anode described in the present invention can also be found commercially and is available as an abundant pigment called Lithopone. Lithopone is an insoluble mixture of barium sulfate and zinc sulfide that precipitates upon mixing solutions of barium sulfide and zinc sulfate then calcined at temperatures above 600° C. The final mixture comprises of 30% of ZnS and 70% of $BaSO_4$.

Figure 13:
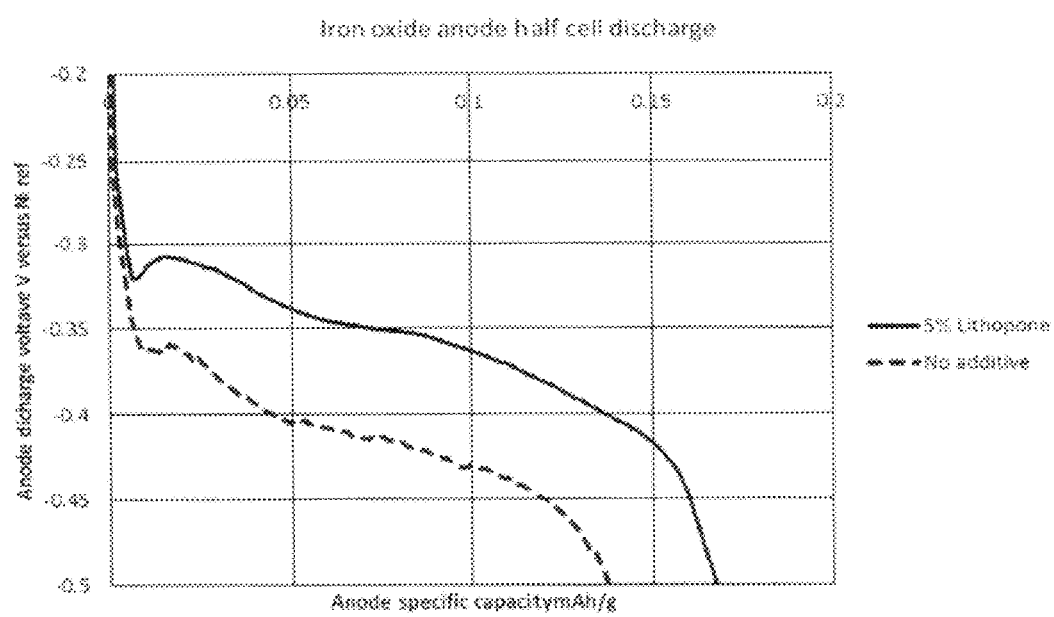

FIG. 13 illustrated the advantage of Lithopone additive when added by 5% to the iron oxide anode. The discharge capacity improvement is about 3× to −0.4V cutoff versus a Ni counter electrode at the 10-hour discharge rate.

Figure 14:
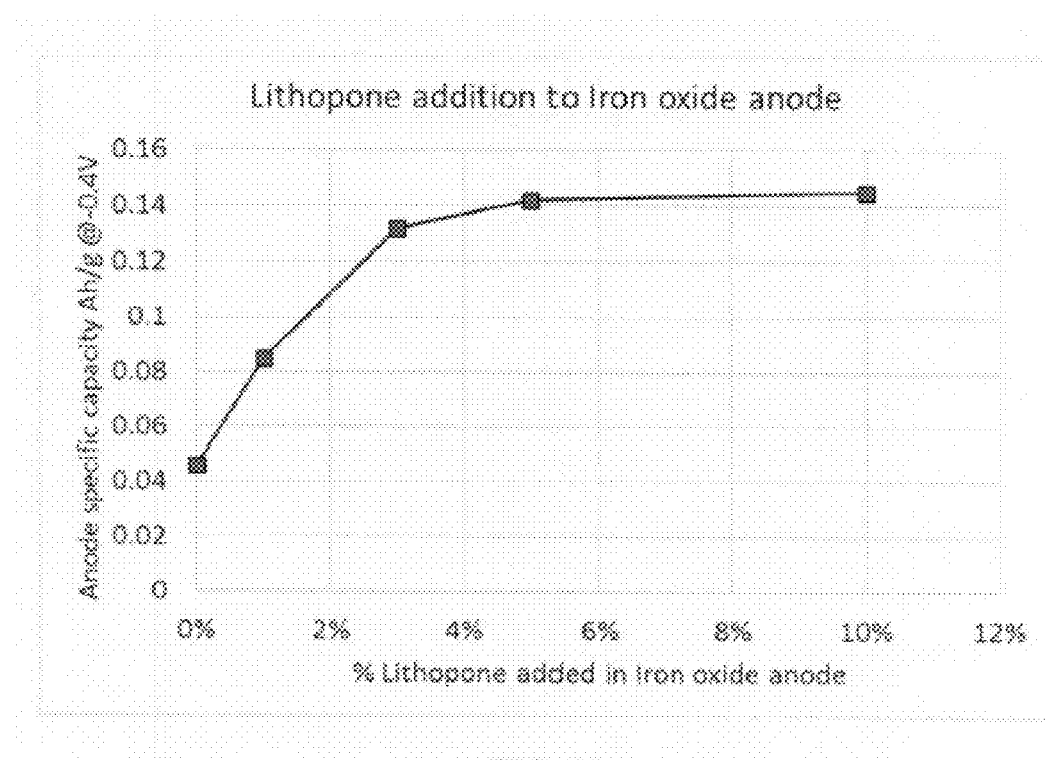

FIG. 14 shows the addition of Lithopone can be as little as 1% and up to 10%. But the optimum amount is about 3-6% as weight percentage of the anode.

Figure 15:
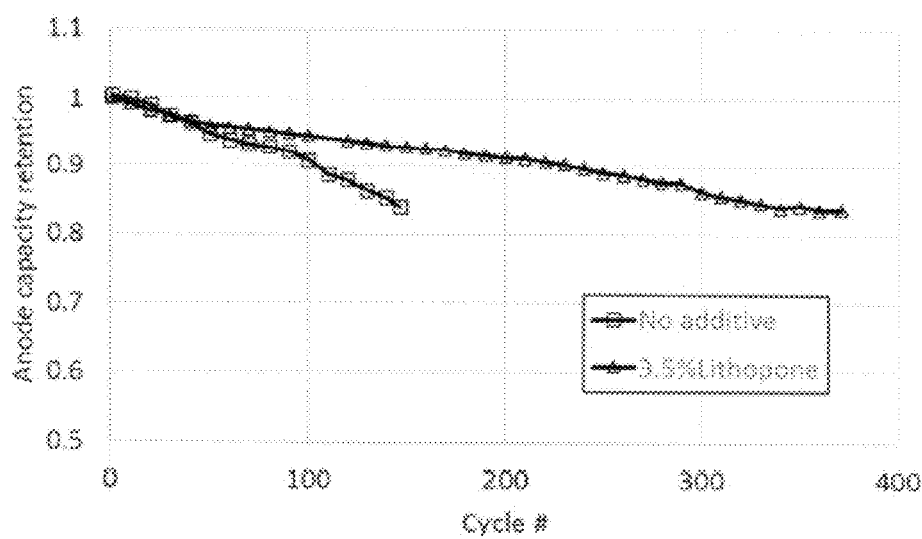

FIG. 15 shows the addition of lithopone (barium sulfate-zinc sulfide) also improved the cycle life of iron oxide anode. Cycle life retention for iron oxide anode with 3.5% lithopone is more than 2× longer than without any lithopone additive. Longer cycle life and higher discharge voltage means energy throughput of Nickel-Iron cell with the Lithopone additive is much improved in comparison to cell without the additive In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A nickel iron battery comprising:
a housing;
an electrolyte solution contained within the housing;
an anode comprising iron retained within the housing and the electrolyte solution;
a cathode comprising nickel retained within the housing and the electrolyte solution; and
a separator retained within the housing and the electrolyte solution, wherein the separator is interposed between the cathode and the anode, and includes a gas barrier layer preventing gases from moving between the anode and the cathode during a charging cycle.

2. The nickel iron battery of claim 1, wherein the separator further prevents iron from moving between the anode and the cathode, and permits the electrolyte solution to pass through the separator.

3. The nickel iron battery of claim 1, wherein the gas barrier comprises at least one of polyvinyl alcohol, cellophane, hydroxyl-propyl alcohol, and hydroxyl methyl propyl alcohol.

4. The nickel iron battery of claim 1, wherein the anode further comprises a barium salt-sulfide compound.

5. The nickel iron battery of claim 4, wherein the anode further comprises an electrically conductive sulfide compound.

6. The nickel iron battery of claim 4, wherein the barium salt-sulfide compound comprises lithopone.

7. The nickel iron battery of claim 1, further comprising a catalyst system disposed between the cathode and the anode, wherein the catalyst system catalytically combines hydrogen with hydroxide ions to form water.

8. The nickel iron battery of claim 7, wherein the catalyst system comprises:
a hydrogen catalyst layer, wherein the hydrogen catalyst layer oxidizes hydrogen gas encountering the hydrogen catalyst layer; and
an oxygen catalyst layer, wherein the oxygen catalyst layer reduces oxygen encountering the oxygen catalyst layer and a transition metal catalyst is oxidized.

9. The nickel iron battery of claim 1, further comprising a cover plate sealed on the housing, wherein the cover plate has at least a first vent opening and a second vent opening, wherein each vent opening is sealed with a membrane that is permeable to gas and impermeable to the electrolyte solution.

10. The nickel iron battery of claim 9, wherein the cover plate is substantially rectangular, and wherein the first vent opening is positioned at a first corner of the cover plate and the second vent opening is positioned at the opposite corner of the cover plate.

11. A nickel iron battery comprising:
an electrolyte solution;
an anode within the electrolyte solution and comprising iron and a barium salt-sulfide compound;
a cathode within the electrolyte solution and comprising nickel; and
a separator within the electrolyte solution and interposed between the cathode and the anode.

12. The nickel iron battery of claim 11, wherein the separator comprises a gas barrier layer preventing gases from moving between the anode and the cathode during a charging cycle, preventing iron from moving between the anode and the cathode, and permitting the electrolyte solution to pass through the separator.

13. The nickel iron battery of claim 12, wherein the gas barrier comprises at least one of polyvinyl alcohol, cellophane, hydroxyl-propyl alcohol, and hydroxyl methyl propyl alcohol.

14. The nickel iron battery of claim 11, wherein the anode further comprises an electrically conductive sulfide compound.

15. The nickel iron battery of claim 14, wherein the barium salt-sulfide compound comprises lithopone.

16. The nickel iron battery of claim 11, further comprising a catalyst system disposed between the cathode and the anode, wherein the catalyst system catalytically combines hydrogen with hydroxide ions to form water.

17. The nickel iron battery of claim 16, wherein the catalyst system comprises:
a hydrogen catalyst layer, wherein the hydrogen catalyst layer oxidizes hydrogen gas encountering the hydrogen catalyst layer; and
an oxygen catalyst layer, wherein the oxygen catalyst layer reduces oxygen encountering the oxygen catalyst layer and a transition metal catalyst is oxidized.

18. The nickel iron battery of claim 11, further comprising a cover plate sealed on a housing containing the electrolyte solution, wherein the cover plate has at least a first vent opening and a second vent opening, wherein each vent opening is sealed with a membrane that is permeable to gas and impermeable to the electrolyte solution.

19. The nickel iron battery of claim 18, wherein the cover plate is substantially rectangular, and wherein the first vent opening is positioned at a first corner of the cover plate and the second vent opening is positioned at the opposite corner of the cover plate.

20. A nickel iron battery, comprising:
a housing;
an electrolyte solution contained within the housing;
a cover plate sealed on the housing, wherein the cover plate:
includes at least a first vent opening and a second vent opening, wherein each vent opening is sealed with a membrane that is permeable to gas and impermeable to the electrolyte solution; and
is substantially rectangular, and wherein the first vent opening is positioned at a first corner of the cover plate and the second vent opening is positioned at the opposite corner of the cover plate;
an anode within the housing and the electrolyte solution and comprising iron, wherein the anode further comprises:
a barium salt-sulfide compound comprising lithopone; and
an electrically conductive sulfide compound;
a cathode within the housing and the electrolyte solution and comprising nickel;
a separator in the housing and the electrolyte solution, wherein the separator is interposed between the cathode and the anode, and includes a gas barrier layer preventing gases from moving between the anode and the cathode during a charging cycle, wherein:
   the separator further prevents iron from moving between the anode and the cathode and permits the electrolyte solution to pass through the separator; and
   the gas barrier comprises at least one of polyvinyl alcohol, cellophane, hydroxyl-propyl alcohol, and hydroxyl methyl propyl alcohol; and
a catalyst system disposed between the cathode and the anode, wherein the catalyst system catalytically combines hydrogen with hydroxide ions to form water, wherein the catalyst system comprises:
   a hydrogen catalyst layer, wherein the hydrogen catalyst layer oxidizes hydrogen gas encountering the hydrogen catalyst layer; and
   an oxygen catalyst layer, wherein the oxygen catalyst layer reduces oxygen encountering the oxygen catalyst layer and a transition metal catalyst is oxidized.

* * * * *